(12) United States Patent
Cisternino et al.

(10) Patent No.: US 8,910,678 B2
(45) Date of Patent: Dec. 16, 2014

(54) SELECTIVE FUEL NOZZLE INHIBITING SYSTEM

(75) Inventors: Franco A. Cisternino, Deerfield, IL (US); Michael J. Hall, Manhattan, IL (US); Joseph L. Rodawold, Wilmington, IL (US); Paul M. Sutenbach, Highland Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 757 days.

(21) Appl. No.: 12/596,040

(22) PCT Filed: Apr. 8, 2008

(86) PCT No.: PCT/US2008/059637
§ 371 (c)(1),
(2), (4) Date: Oct. 15, 2009

(87) PCT Pub. No.: WO2008/127916
PCT Pub. Date: Oct. 23, 2008

(65) Prior Publication Data
US 2010/0132838 A1   Jun. 3, 2010

Related U.S. Application Data

(60) Provisional application No. 60/923,602, filed on Apr. 16, 2007.

(51) Int. Cl.
*B65B 1/04* (2006.01)
*B60K 15/04* (2006.01)

(52) U.S. Cl.
CPC ......... *B60K 15/04* (2013.01); *B60K 2015/0483* (2013.01)
USPC ............................ 141/350; 141/367; 220/86.2

(58) Field of Classification Search
USPC ................. 141/301, 302, 349, 350, 352, 367; 220/86.2
See application file for complete search history.

(56) References Cited

U.S. PATENT DOCUMENTS 3,730,216 A * 5/1973 Arnett et al. .................. 137/588
6,302,169 B1 * 10/2001 Pulos ............................ 141/301
(Continued)

FOREIGN PATENT DOCUMENTS

| AT | 007933 U1 | 11/2005 |
|----|-----------|---------|
| AT | 7933 U1 | 11/2005 |

(Continued)

OTHER PUBLICATIONS

ISR for PCT/US2008/059637 mailed Jul. 30, 2008.

*Primary Examiner* — Timothy L Maust
(74) *Attorney, Agent, or Firm* — Lowe Hauptman & Ham LLP

(57) ABSTRACT

A fuel intake assembly may include a main tube (24, 56, 98, 122) defining a fuel channel (25, 57, 99) at least one flapper (30, 94, 126, 166) pivotally secured within the main tube (24, 56, 98, 122), and a selective nozzle inhibitor (160) proximate the at least one flapper (30, 94, 126, 166). The least one flapper closes the fuel channel (25, 57, 99) in a closed position. The selective nozzle inhibitor (160) allows a first nozzle having a first diameter to move the at least one flapper into an open position. The selective nozzle inhibitor (160) allows a second nozzle having a second diameter to move the at least one-flapper into the open position, wherein the second diameter is greater than the first diameter. The selective nozzle inhibitor (160) prevents a third nozzle having a third diameter to open the at least one flapper, wherein the third diameter is less than the first diameter.

26 Claims, 14 Drawing Sheets

(56) References Cited

U.S. PATENT DOCUMENTS

| | | | |
|---|---|---|---|
| 6,966,349 B1 | 11/2005 | Laduke | |
| 6,968,874 B1 | 11/2005 | Gabbey et al. | |
| 7,182,111 B2 * | 2/2007 | McClung et al. | 141/352 |
| 7,293,586 B2 * | 11/2007 | Groom et al. | 141/350 |
| 7,302,977 B2 * | 12/2007 | King et al. | 141/367 |
| 7,661,550 B2 * | 2/2010 | Feichtinger | 220/86.2 |
| 7,665,493 B2 * | 2/2010 | Groom et al. | 141/350 |
| 7,950,425 B2 * | 5/2011 | Och | 141/367 |
| 2008/0092986 A1 | 4/2008 | Buchgraber | |
| 2010/0006178 A1 | 1/2010 | Muth et al. | |

FOREIGN PATENT DOCUMENTS

| | | |
|---|---|---|
| CA | 2616668 A1 | 2/2007 |
| DE | 10339610 A1 | 3/2005 |
| DE | 202005012256 U1 | 12/2006 |
| DE | 202005012256 U1 | 1/2007 |
| EP | 1319545 A1 | 6/2003 |
| GB | 2421499 A * | 6/2006 |

* cited by examiner

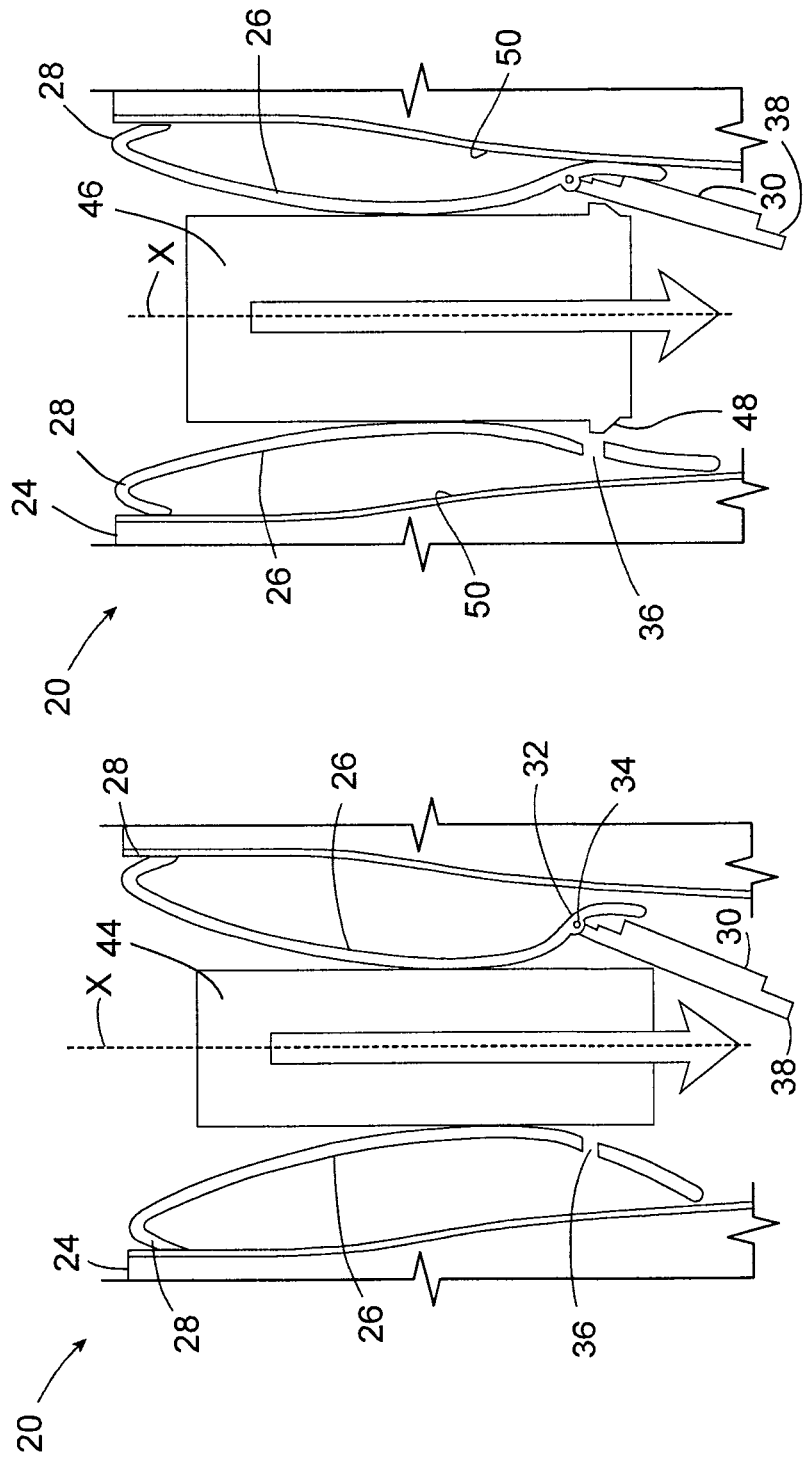

SELECTIVE FUEL NOZZLE INHIBITING SYSTEM

RELATED APPLICATIONS

This application relates to and claims priority benefits from U.S. Provisional Patent Application No. 60/923,602 entitled "Mis-Fuel Inhibitor," filed Apr. 16, 2007, which is hereby incorporated by reference in its entirety.

FIELD OF THE INVENTION

Embodiments of the present invention generally relate to fuel nozzle entry systems, and more particularly, to fuel nozzle entry systems that inhibit improper fuel nozzles from dispensing fuel into a fuel tank.

BACKGROUND OF THE INVENTION

Many passenger and commercial vehicles are powered through diesel fuel. The automotive industry continues to produce diesel powered vehicles at an increasing rate. Refueling stations provide diesel fuel for customers. Indeed, in Europe, nearly 50% of all passenger vehicles are powered by diesel fuel.

Many diesel powered vehicles are susceptible to being mis-fueled, however, with gasoline (petrol). Gasoline nozzles typically are smaller than diesel nozzles and may be inserted into a refueling orifice of a diesel powered vehicle. Conversely, the larger size of a diesel nozzle typically prevents it from being inserted into the smaller refueling orifice of a gasoline powered vehicle.

An example of a mis-fuel inhibitor is shown and described in WO 2005/077698, entitled "Filler Neck To Fill Fuel Into A Vehicle Tank." The mis-fuel inhibitor discriminates between smaller gasoline nozzles and larger diesel nozzles used for refueling passenger vehicles.

SUMMARY OF THE INVENTION

Embodiments of the present invention provide a mis-fuel protection system and method that prevents entry of smaller nozzles, such as gasoline nozzles (~ø21 mm) and smaller nozzles (~ø19 mm) that are used to dispense other chemicals, such as urea, into a fuel supply line of a vehicle, yet allow entry of diesel nozzles, including standard diesel nozzles (~ø25 mm), as well as high flow truck stop nozzles (~ø36 mm).

Certain embodiments provide a fuel intake assembly that includes a main tube, cylinder or fuel intake line defining a fuel channel and a selective nozzle inhibitor. The selective nozzle inhibitor allows one type of fuel dispensing nozzle, such as a standard diesel or high flow diesel nozzle, to dispense fuel into a fuel tank, while preventing another type of fuel nozzle, such as a gasoline nozzle, from dispensing fuel into the fuel tank. The gasoline nozzle is smaller than the diesel nozzles.

Certain embodiments of the present invention provide a fuel intake assembly that includes a main tube defining a fuel channel, at least one flapper pivotally secured within the main tube, wherein the at least one flapper closes the fuel channel in a closed position, and a selective nozzle inhibitor proximate the at least one flapper.

The selective nozzle inhibitor is configured to allow a first nozzle having a first diameter to move the at least one flapper into an open position, and may also allow a second nozzle having a second diameter to move the at least one flapper into the open position. The second diameter may be greater than the first diameter. Additionally, the selective nozzle inhibitor prevents a third nozzle having a third diameter to open the at least one flapper, wherein the third diameter may be less than the first diameter.

The first nozzle may be a standard diesel nozzle. The second nozzle may be a high flow diesel nozzle having a ringed end. The third nozzle may be a gasoline nozzle.

The selective nozzle inhibitor may include a funneled ring and a cruciform cone within the main tube. The funneled ring may include a plunger and a clasp. The clasp may be configured to securely retain the at least one flapper in the closed position. The funneled ring may be configured to allow the first and second nozzles to urge the plunger into the at least one flapper and the clasp away from the at least one flapper to move the at least one flapper into the open position. The cruciform cone may be configured to prevent the third nozzle from urging the plunger into the at least one flapper. Additionally, a compression spring may be positioned between the cruciform cone and the funneled ring.

The at least one flapper may include at least one protuberance, such as a ridge, rib, post, knob or the like, that prevents the second nozzle from moving past the at least one flapper in the open position.

Alternatively, the selective nozzle inhibitor may include at least one bow-shaped spring having a notch, wherein the notch retains an edge of the at least one flapper in the closed position. The first and second nozzles arc configured to flex the bow-shaped spring away from the at least one flapper so that the edge of the at least one flapper disengages from the notch. The third nozzle may be unable to flex the bow-shaped spring away from the at least one flapper. The at least one bow-shaped spring may include a plurality of bow-shaped springs, wherein distances between the plurality of bow-shaped springs proximate the at least one flapper in the closed position may be greater than the third diameter, but less than the first and second diameters.

Also, alternatively, the selective nozzle inhibitor may include first and second fingers, wherein the at least one flapper is pivotally secured to the first finger and the second finger comprises a slot that retains an edge of the at least one flapper in the closed position. The first and second nozzles are configured to flex the fingers away from one another so that the edge of the at least one flapper disengages from the slot. A distance between the first finger and the second finger proximate the at least one flapper in the closed position may be greater than the third diameter, but less than the first and second diameters.

Alternatively, the selective nozzle inhibitor may include opposed roller assemblies. Each assembly may include a compression spring operatively connected to a roller and a ledge outwardly extending from the compression spring below the roller. The ledges support the at least one flapper in the closed position. The first and second nozzles may be configured to compress the compression springs and disengage the ledges from the at least one flapper. The third nozzle may be unable to compress both of the compression springs at the same time.

Certain embodiments of the present invention provide a fuel intake assembly including a main tube defining a fuel channel, a web secured within the fuel channel, wherein the web has open areas, and a plurality of pivot arms positioned over the web. Each pivot arm includes an angled beam that is pivotally secured within the main tube. The angled beam integrally connects to a leg, which, in turn, integrally connects to a shelf. The pivot arms are compressively biased together in the closed position through an annular spring.

Each of first and second nozzles, having first and second diameters, respectively, is configured to spread the pivot aims apart to expose the open areas of the web. The second diameter may be greater than the first diameter. A third nozzle is too small to spread the pivot arms apart, wherein the third nozzle has a third diameter that is less than the first diameter. The first diameter may be θ25 mm. The second diameter may be θ36 mm. The third diameter may be less than θ21 mm.

BRIEF DESCRIPTION OF SEVERAL VIEWS OF THE DRAWINGS

FIG. 5 illustrates a cross-sectional view of a standard diesel nozzle inserted into a diesel fuel supply line through line 5-5 of FIG. 4 according to an embodiment of the present invention.

FIG. 6 illustrates a cross-sectional view of a high flow diesel nozzle inserted into a diesel fuel supply line according to an embodiment of the present invention.

Figure 1:
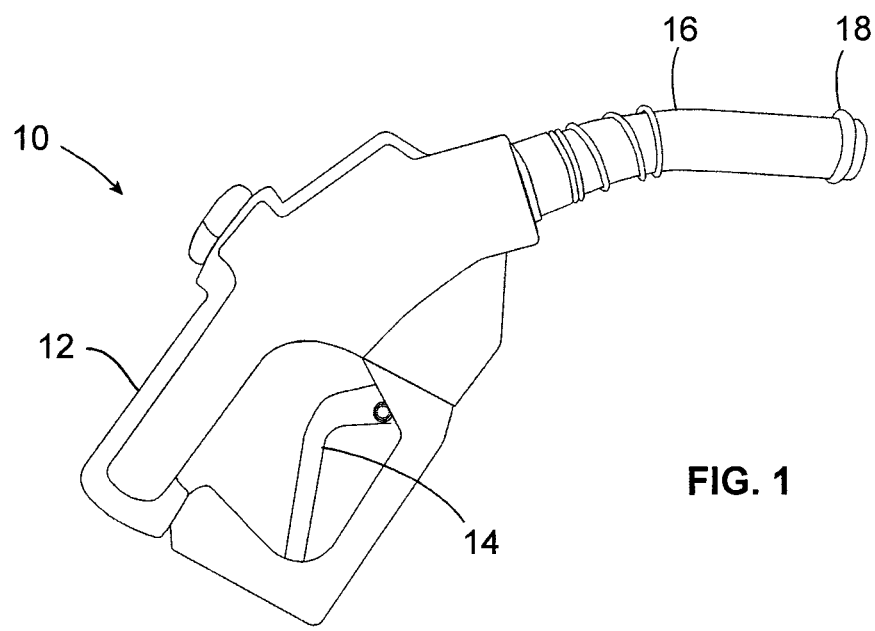
FIG. 1 illustrates a lateral view of a high flow diesel fuel dispensing device according to an embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

Embodiments of the present invention provide a variety of selective fuel supply or nozzle inhibitors that are configured to allow a first type of nozzle, such as a diesel fuel nozzle, to dispense fuel into a fuel tank, such as a diesel fuel tank, while preventing other types of nozzles, which may be smaller than the first type of nozzle, from dispensing fuel into the fuel tank. As discussed below, the nozzle inhibitors may be fingers, springs, roller assemblies, cruciform cones and funneled sleeves or the like.

FIG. 1 illustrates a lateral view of a high flow diesel fuel dispensing device 10 according to an embodiment of the present invention. The device 10 includes a handle 12 operatively connected to a trigger 14. The handle 12 is configured to be grasped by an operator and is connected to a nozzle 16. The nozzle 16 may include a ring 18 at a distal end. The nozzle 16 may have a relatively large diameter (e.g., ~θ30 mm), while the diameter of the ring 18 may be even larger (e.g., ~θ36 mm).

Standard diesel and gasoline dispensing devices are configured in a similar fashion, but their nozzle diameters may differ. For example, a standard diesel nozzle may be ~θ25 mm and may not include a ring at a distal end.

Figure 2:
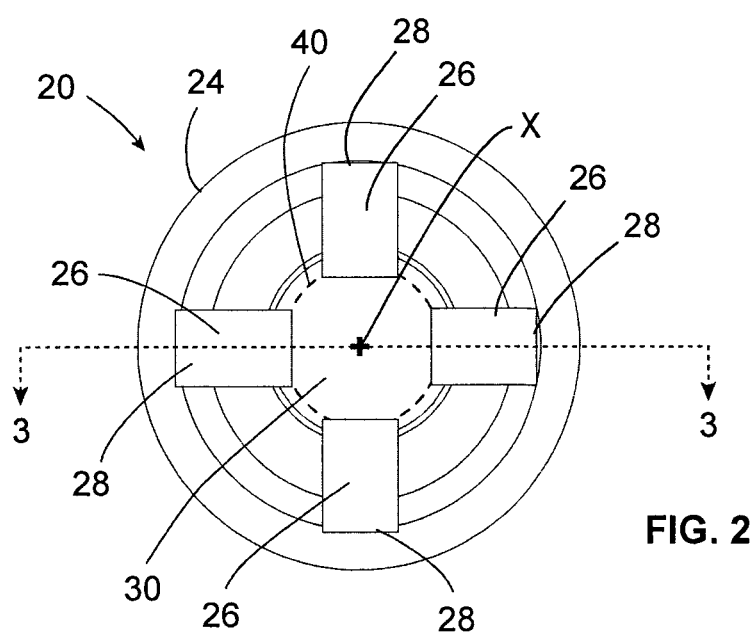
FIG. 2 illustrates an axial view of a diesel fuel supply line in a closed position according to an embodiment of the present invention.
Figure 3:
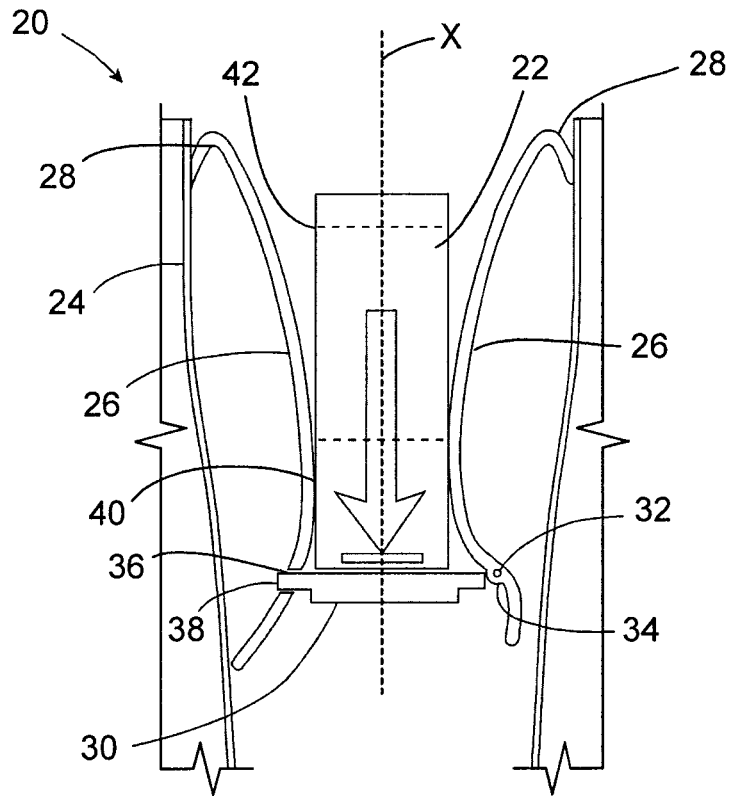
FIG. 3 illustrates a cross-sectional view of a gasoline nozzle inserted into a diesel fuel supply line through line 3-3 of FIG. 2 according to an embodiment of the present invention.

FIG. 2 illustrates an axial view of a diesel fuel supply line 20 according to an embodiment of the present invention. FIG. 3 illustrates a cross-sectional view of a gasoline nozzle 22 inserted into the diesel fuel supply line 20 through line 3-3 of FIG. 2. Referring to FIGS. 2 and 3, the diesel fuel supply line 20 includes a main cylindrical supply line or tube 24 having a fuel channel 25 and a plurality of flexible fingers 26 or springs extending from the supply line 24 toward an axial center X.

Proximate ends 28 of the fingers 26 are secured to interior surfaces of the main tube 24 and are configured to be biased toward the axial center X. The main tube 24 and fingers 26 may be formed from molded plastic, such as acetal. Optionally, the fingers 26 may be formed of a spring steel, while the tube 24 is formed of a metal.

A flapper 30 is pivotally secured to one of the fingers 26 and latchably secures to the other fingers 26, as shown in FIG. 3. For example, one of the fingers 26 may include a channel 32 through which a spring-biased rod 34 (such as a torsion spring-biased rod) of the flapper 30 is pivotally secured. Thus, the flapper 30 may pivot through open and closed positions by way of the rod 34 pivoting within the channel 32. Optionally, the flapper 30 may be pivotally secured to an interior wall of the tube 24.

The other fingers 26 include slots 36 that are configured to latchably retain circumferential edges 38 of the flapper 30. As such, the slots 36 secure the flapper 30 in a closed position. While the diesel fuel supply line 20 is shown having four fingers 26, more or less fingers 26 may be used.

The fingers 26 cooperate with one another to provide a selective nozzle inhibitor that prevents a gasoline nozzle from opening the flapper 30, but allows the larger diameter diesel fuel nozzle to open the flapper 30. As shown in FIG. 3, the interior diameter 40 defined by the fingers 26 at positions furthest extended toward the axial center X is larger than the outer diameter 42 of the gasoline nozzle 22. As such, the gasoline nozzle 22 is unable to expand the fingers 26 apart from one another. When the gasoline nozzle 22 is inserted into the main cylindrical supply line 24, the fingers 26 guide it toward the axial center X. In this position, the flapper 30 remains closed due to the latchably engagement of the circumferential edges 38 in the slots 36. If the gasoline nozzle 22 is engaged, dispensed fuel is prevented from passing further into the diesel fuel supply line 20 toward a fuel tank because the flapper 30 blocks its path. In short, when the flapper 30 is closed, refueling is not possible. Fuel flow is blocked by the closed flapper 30, thereby causing the nozzle 22 to automatically shut-off if a user attempts to actuate the fueling trigger. Thus, the diesel fuel supply line 20 is configured to prevent a gasoline nozzle 22 from dispensing gasoline into a diesel fuel tank.

Figure 4:
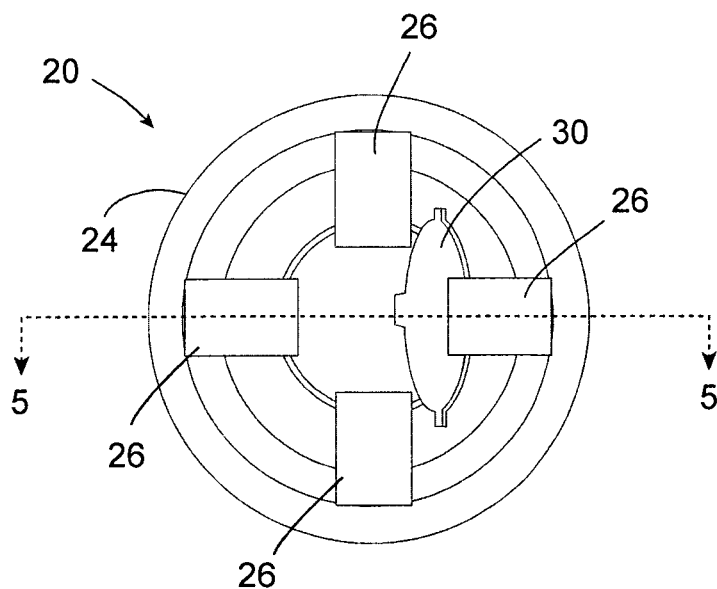
FIG. 4 illustrates an axial view of a diesel fuel supply line in an open position according to an embodiment of the present invention.

FIG. 4 illustrates an axial view of the diesel fuel supply line 20 in an open position according to an embodiment of the present invention. FIG. 5 illustrates a cross-sectional view of a standard diesel nozzle 44 inserted into the diesel fuel supply line 20 through line 5-5 of FIG. 4. Referring to FIGS. 4 and 5, the standard diesel nozzle 44 has a larger diameter than that of the gasoline nozzle 22 shown in FIG. 3. When the standard diesel nozzle 44 enters the diesel fuel supply line 20, the standard diesel nozzle 44 is urged into the fingers 26, thereby spreading them apart. As the fingers 26 spread apart, the circumferential edge 38 of the flapper 30 unlatches or dislodges from the slots 36, thereby providing an open fuel path toward the fuel tank. Thus, fuel may be dispensed from the standard diesel nozzle 44 and into the fuel tank. When the nozzle 44 is removed from the line 20, the flapper 30 pivots back into a closed position (for example, the spring-biased rod 34 may move the flapper 30 back to its at-rest position) and the fingers 26 flex back toward the axial center X, thereby latching onto the circumferential edges 38 of the flapper 30. Thus, the diesel fuel supply line 20 is configured to allow a standard diesel nozzle 22 to dispense fuel into the fuel tank.

FIG. 6 illustrates a cross-sectional view of a high flow diesel nozzle 46 inserted into the diesel fuel supply line 20 according to an embodiment of the present invention. The nozzle 46 has a larger diameter than that of the standard diesel nozzle 44, shown in FIG. 5. The nozzle 46 spreads the fingers 26 open similar to that described above with respect to FIGS. 4 and 5, thereby opening the flapper 30. As shown in FIG. 6, the finger 26 having the flapper 30 is biased into an interior wall 50 of the line 20. As such, the flapper 30 is prevented from pivoting further toward the interior wall 50. In this position, the open flapper 30 prevents the nozzle 46 from moving past the fully-opened flapper 30. That is, the ring 48 at the distal end of the nozzle 46 is too large to move through an opening defined by the fully-opened flapper 30 and interior walls 50 of the diesel fuel supply line 20. This nozzle depth control ensures that the ringed nozzle 46 may be removed from the line 20 without binding on or snagging any of the components within the line 20.

Figure 7:
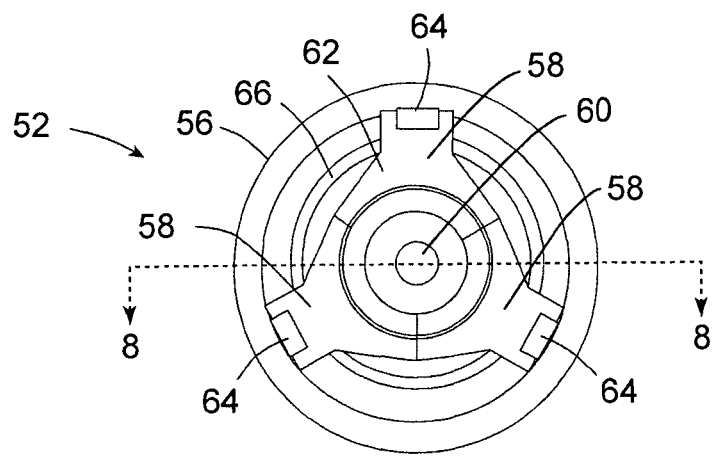
FIG. 7 illustrates an axial view of a diesel fuel supply line in a closed position according to an embodiment of the present invention.
Figure 8:
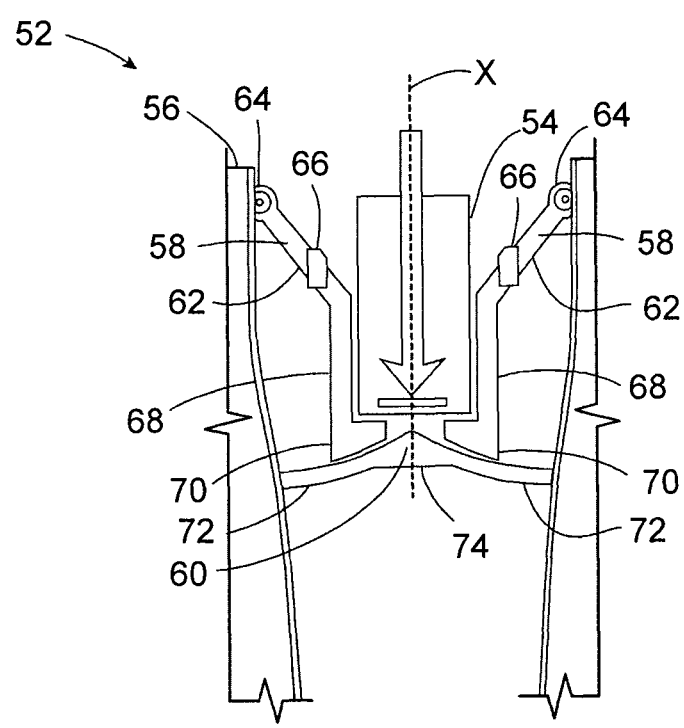
FIG. 8 illustrates a cross-sectional view of a gasoline nozzle inserted into a diesel fuel supply line through line 8-8 of FIG. 7 according to an embodiment of the present invention.

FIG. 7 illustrates an axial view of a diesel fuel supply line 52 in a closed position according to embodiment of the present invention. FIG. 8 illustrates a cross-sectional view of a gasoline nozzle 54 inserted in to the diesel fuel supply line 52 through line 8-8 of FIG. 7. The diesel fuel supply line 52 includes a main cylinder or tube 56 having a fuel channel 57 and a plurality of pivot arms 58 inwardly extending from interior surfaces of the tube 56, A web 60 is positioned beneath the pivot arms 58.

The pivot arms 58 include angled beams 62 that extend toward a central axis X of the tube 56. The beams 62 are secured to the interior walls of the tube 56 through spring-biased pivot tubes 64 or the like. An integrally formed annular spring 66 connects the beams 62 together and exerts an inwardly-directed force that maintains the pivot arms 58 in a closed position when at rest. Distal ends of the angled beams 62 are connected to legs 68, which are, in turn, connected to shelves 70 that overlay the web 60.

The pivot arms 58 cooperate with one another to provide a selective fuel supply or nozzle inhibitor. As shown in FIG. 8, the gasoline nozzle 54 is not wide enough to spread the pivot arms 58 open. Thus, when the gasoline nozzle 54 is inserted into the diesel fuel supply line 52, the shelves 70 remain over open portions 72 of the web. In this position, a liquid-tight barrier defined by the shelves 70 and a solid tip 74 of the web 60 is exposed. Therefore, any gasoline dispensed from the nozzle 54 is prevented from passing into the diesel fuel supply line 52 past the barrier. Thus, the diesel fuel supply line 52 is configured to prevent gasoline from being dispensed into the diesel fuel tank.

Figure 9:
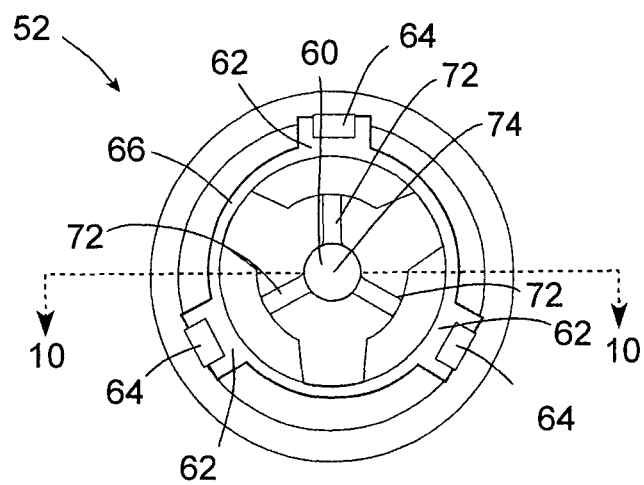
FIG. 9 illustrates an axial view of a diesel fuel supply line in an open position according to an embodiment of the present invention.
Figure 10:
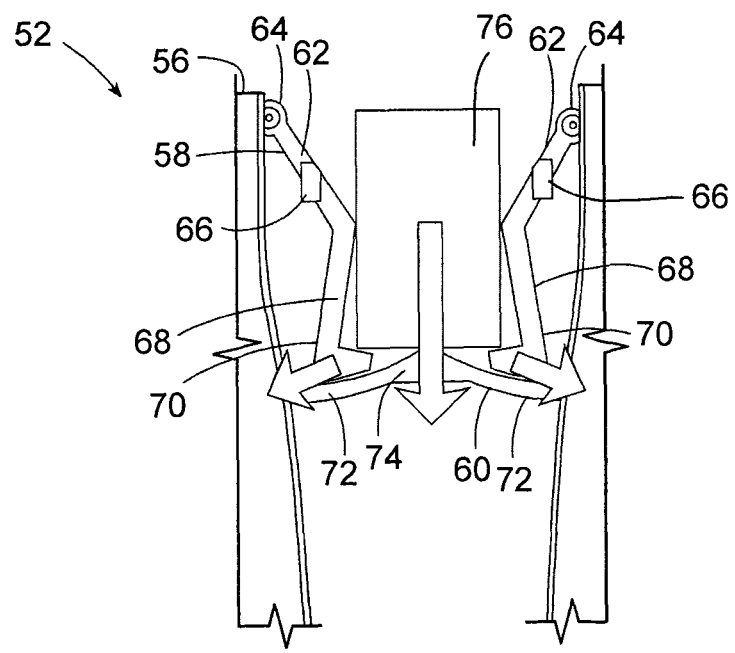
FIG. 10 illustrates a cross-sectional view of a standard diesel nozzle inserted into a diesel fuel supply line through line 9-9 of FIG. 10 according to an embodiment of the present invention.

FIG. 9 illustrates an axial view of the diesel fuel supply line 52 in an open position according to an embodiment of the present invention. FIG. 10 illustrates a cross-sectional view of a standard diesel nozzle 76 inserted into the diesel fuel supply line 52 through line 9-9 of FIG. 10. Because the standard diesel nozzle 76 is wider than the opening defined between the legs 68, the nozzle 76 spreads the legs 68 and shelves 70 apart. During this movement, the pivot arms 62 pivot apart by way of the pivot tube 64. The force exerted by the nozzle 76 overcomes the contracting force exerted into the pivot arms by the annular spring 66. As the shelves 70 spread apart, the open areas 72 of the web 60 are exposed. Thus, fuel dispensed from the nozzle 76 is allowed to pass into the fuel tank.

As the nozzle 76 is removed, the spring 66 contracts the pivot arms 62 back toward one another. As such, the shelves 70 move back over the open areas 72 of the web 60.

Figure 11:
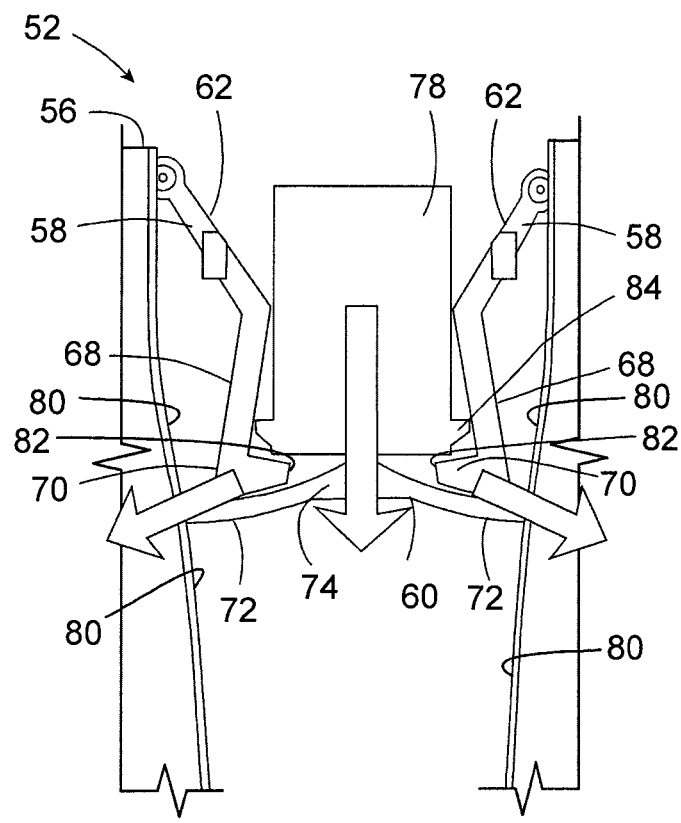
FIG. 11 illustrates a cross-sectional view of a high flow diesel nozzle inserted into a diesel fuel supply line according to an embodiment of the present invention.

FIG. 11 illustrates a cross-sectional view of a high flow diesel nozzle 78 inserted into the diesel fuel supply line 52 according to an embodiment of the present invention. At their farthest points of expansion, distal ends of the pivot arms 58 abut into interior walls 80 of the main tube 56. In this position, the distance between tips 82 of the shelves 70 is smaller than the diameter of the ring 84 of the nozzle 78. Thus, the nozzle 78 is unable to pass through the opening defined by the tips 82 of the shelves 70, thereby ensuring that the nozzle 78 does not perforate the web 60 or otherwise pass further into the tube 56. Further, the web 60 itself may provide a barrier past which the nozzle 78 may not pass. This nozzle depth control ensures that the ringed nozzle 78 may be removed from the line 52 without binding on or snagging any of the components therein.

Figure 12:
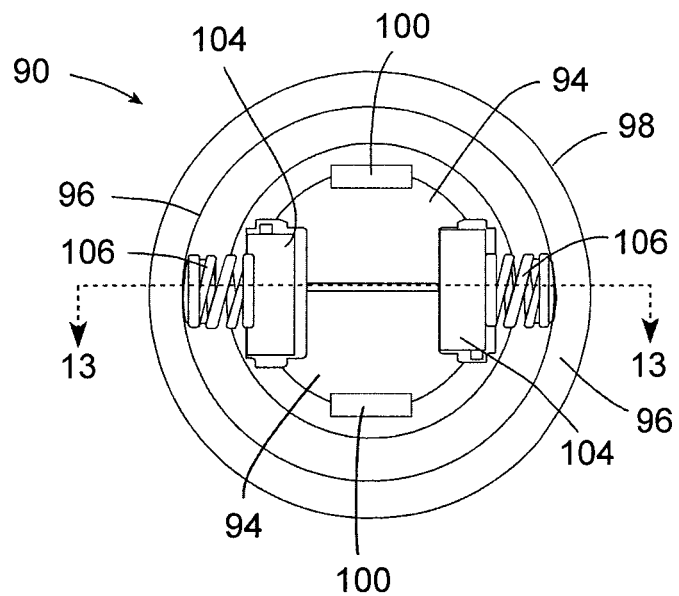
FIG. 12 illustrates an axial view of a diesel fuel supply line in a closed position according to an embodiment of the present invention.
Figure 13:
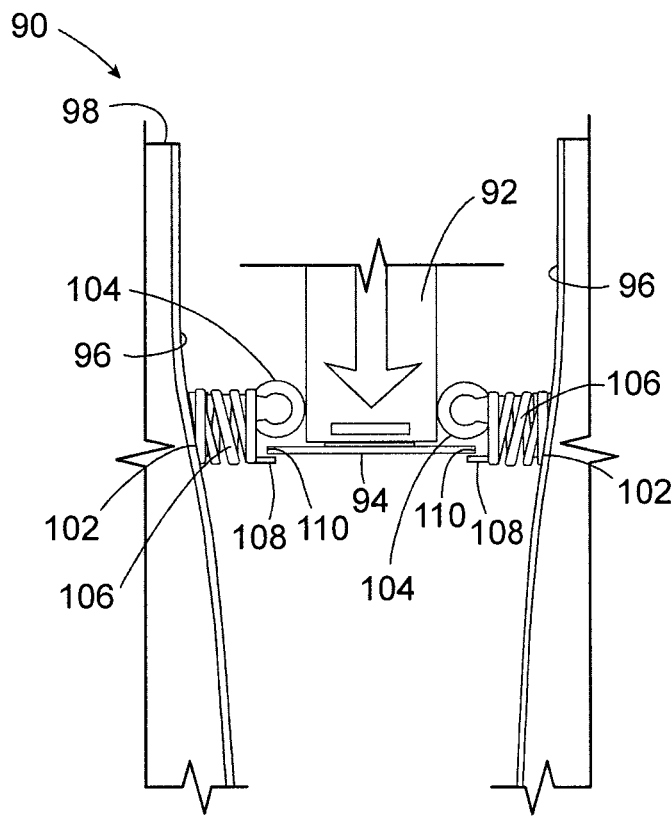
FIG. 13 illustrates a cross-sectional view of a gasoline nozzle inserted into a diesel fuel supply line through line 13-13 of FIG. 12 according to an embodiment of the present invention.

FIG. 12 illustrates an axial view of a diesel fuel supply line 90 in a closed position according to an embodiment of the present invention. FIG. 13 illustrates a cross-sectional view of a gasoline nozzle 92 inserted into the diesel fuel supply line through line 13-13 of FIG. 12. Referring to FIGS. 12 and 13, the supply line 90 includes opposed flapper doors 94 pivotally secured to interior walls 96 of a main tube 98 having a fuel channel 99 through spring-biased pivot tubes 100.

Spring biased roller assemblies 102 are positioned 180° apart from one another and each is spaced approximately 90° from the pivot tubes 100, however, other positions and orientations may be used. Each roller assembly 102 includes a roller 104, such as a wheel or rotatable pin, secured to a spring 106 that is secured to the interior wall 96. As shown in FIG. 13, in particular, a ledge 108 extends outwardly from each spring 106 underneath the roller 104. In the closed position, the opposed ledges 108 abut circumferential edges 110 of the flapper doors 94. Thus, the ledges 108 support the flapper doors 94 in a closed position. Instead of rollers 104, the assemblies 102 may include bumpers, cushions, beams or the like. However, the rollers 104 provide a smooth, low friction engaging member that does not damage nozzles.

The roller assemblies 102 cooperate with one another to provide a selective fuel supply or nozzle inhibitor. In their normally biased extended positions, the opposed roller assemblies 102 define a gap therebetween that is wider than the diameter of the nozzle 92. Thus, when the nozzle 92 is positioned between the roller assemblies 102, the nozzle 92 is unable to compress both roller assemblies 102 at the same time. Thus, at least one of the ledges 110 remains under a corresponding flapper door 94. If the nozzle 92 is urged toward one of the roller assemblies 102, that roller assembly 102 may compress, and the ledge 108 may lose contact with the flapper door 94, but the other roller assembly 102 remains extended such that its ledge 108 continues to support the flapper door 94. In general, however, the nozzle 92 does not compress the roller assemblies 102 and, therefore, the flapper doors 94 remain closed.

Figure 14:
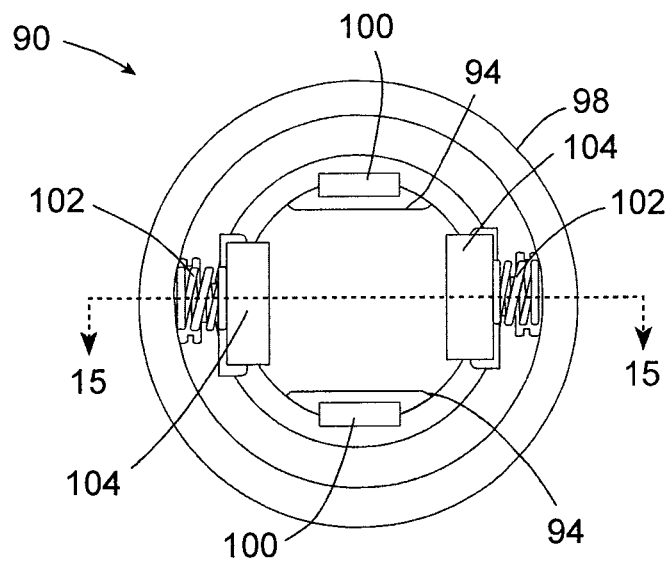
FIG. 14 illustrates an axial view of a diesel fuel supply line in an open position according to an embodiment of the present invention.
Figure 15:
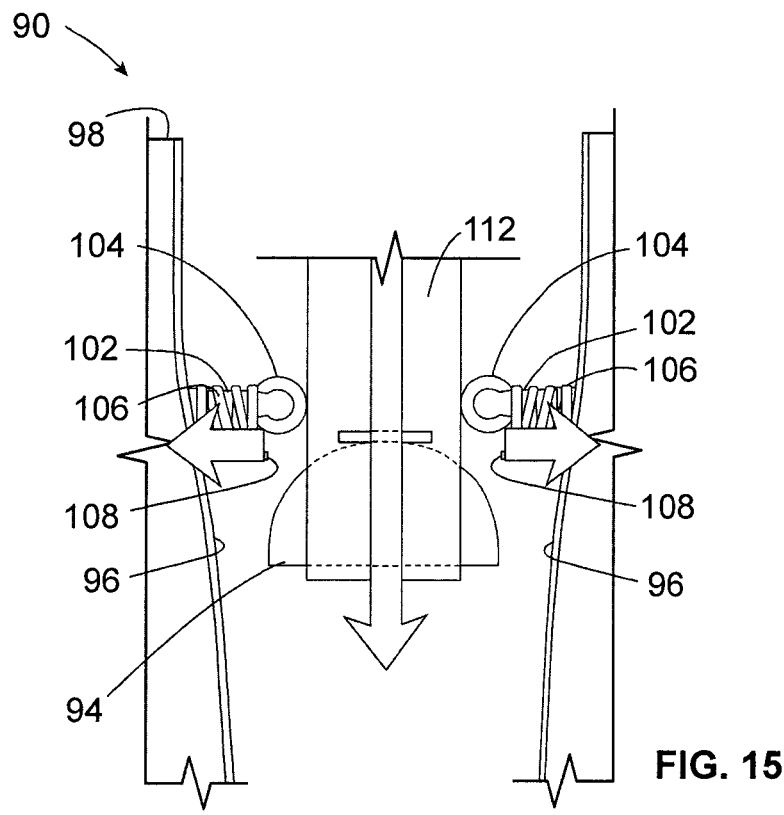
FIG. 15 illustrates a cross-sectional view of a standard diesel nozzle inserted into a diesel fuel supply line through line 15-15 of FIG. 14 according to an embodiment of the present invention.

FIG. 14 illustrates an axial view of the diesel fuel supply line 90 in an open position according to an embodiment of the present invention. FIG. 15 illustrates a cross-sectional view of the standard diesel nozzle 112 inserted into a diesel fuel supply line 90 through line 15-15 of FIG. 14. The nozzle 112 is wider than the space between the roller assemblies 102. When the nozzle 112 is inserted into the line 90, the outer surface of the nozzle 112 engages the rollers 104. As the nozzle 112 is urged further into the line 90, the rollers 104 roll over the surface of the nozzle 112, which forces the roller assemblies 102 to compress toward the interior walls 96 of the tube 98. That is, the springs 106 compress. As the roller assemblies 102 compress, the ledges 108 lose contact with the flapper doors 94. As the nozzle 112 continues to be urged into the line 90, the nozzle forces the flapper doors 94 apart and open. Thus, the nozzle 112 may dispense fuel into the fuel tank.

As the nozzle is removed, the spring biased pivot tubes 100 act to close the flapper doors 94, while the roller assemblies 102 expand back to their at-rest positions. In this position, the ledges 108 re-engage the flapper doors 94.

Additionally, each flapper door 94 may include a protuberance, such as a ridge, so that when both are fully-opened, the distance between the ridges is less than the diameter of a ring on a high flow diesel nozzle. Thus, the high flow diesel nozzle is prevented from moving beyond the ridges. The nozzle depth control ensures that the ringed nozzle may he removed from the line 90 without binding on or snagging any of the components within the line 90.

Figure 16:
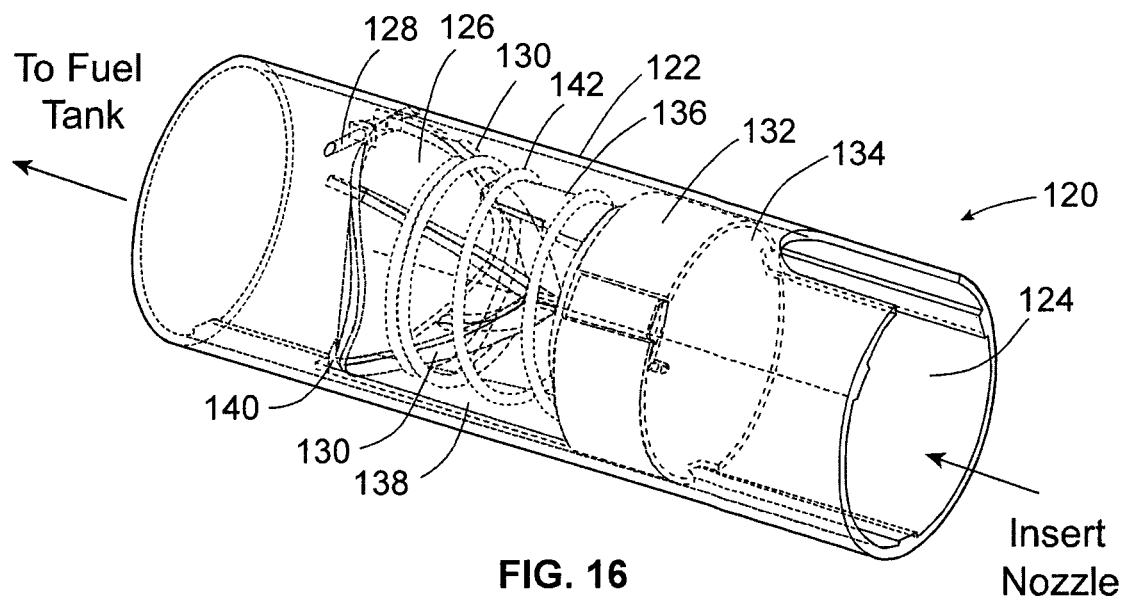
FIG. 16 illustrates an isometric internal view of a fuel supply line according to an embodiment of the present invention.

FIG. 16 illustrates an isometric internal view of a fuel supply line 120 according to an embodiment of the present invention. The fuel supply line 120 includes a main tube 122 or sleeve having an opening 124 configured to receive a fuel dispensing nozzle. Inside the tube 122, a flapper 126 is pivotally secured by way of a spring-biased pivot rod 128.

A cruciform cone 130 having openings therein is integrally molded to interior walls of the tube 122. The cruciform cone 130 is positioned between the flapper 126 and the opening 124.

A funneled ring 132 is slidably secured within the tube 122 between the cruciform cone 130 and the opening 124. The funneled ring 132 includes an internally-funneled portion that is wider proximate the opening 124 than the portion proximate the cruciform cone 130. A plunger 136 extends from the funneled ring 132 toward the flapper 126. Further, a locking beam 138 extends from the funneled ring 132 and includes a clasp 140 that latches to an opposite side of the flapper 126, thereby ensuring that the flapper 126 is closed in an at-rest position. A spring 142 surrounds a portion of the cruciform cone 130 and is positioned between the cruciform cone 130 and the funneled ring 132. In particular, the spring 142 is biased between the cruciform cone 130 and the funneled ring 132. Thus, in the at-rest position, the spring 142 biases the funneled ring 132 so that the plunger 136 disengages from the flapper 126.

The cruciform cone 130 and the funneled ring 132 act together to provide a selective fuel supply or nozzle inhibitor.

Figure 17:
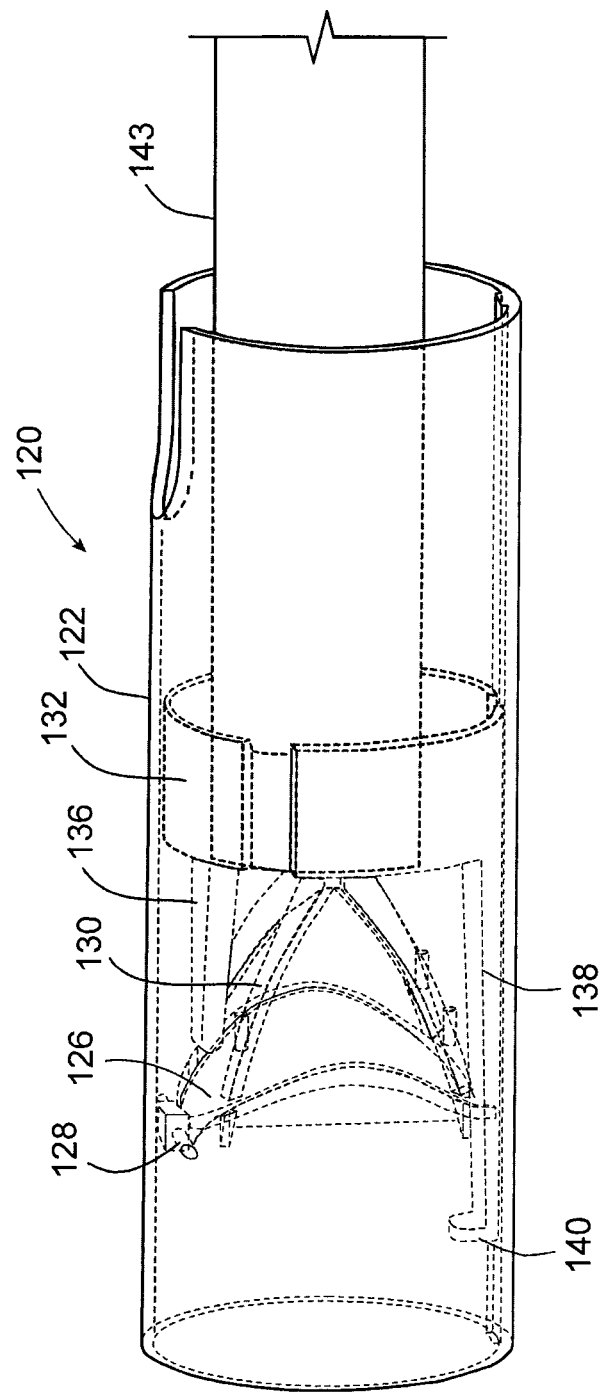
FIG. 17 illustrates an isometric internal view of a gasoline nozzle inserted into a fuel supply line according to an embodiment of the present invention.

FIG. 17 illustrates an isometric internal view of a gasoline nozzle 143 inserted into the fuel supply line 120. For the sake of clarity, the spring 142 is not shown. As the gasoline nozzle 143 moves into the funneled ring 132, the plunger 136 moves toward the flapper 126 while the clasp 140 disengages from the flapper 126. However, the cruciform cone 130 is configured to stop movement of the nozzle 143 through the internal opening of the funneled ring 132 before the plunger 136 contacts the flapper 126. That is, the internal opening of the nozzle 143 is too small to fit over the cruciform cone 130 at a position that allows the nozzle 143 to also move the plunger 136 into the flapper 126. Thus, the cruciform cone 130 ensures that the gasoline nozzle 143 cannot open the flapper 126 and dispense gasoline into the fuel tanks. When the nozzle 143 is removed, the spring 142 (shown in FIG. 16) forces the funneled ring 132 back to its at-rest position.

Figure 18:
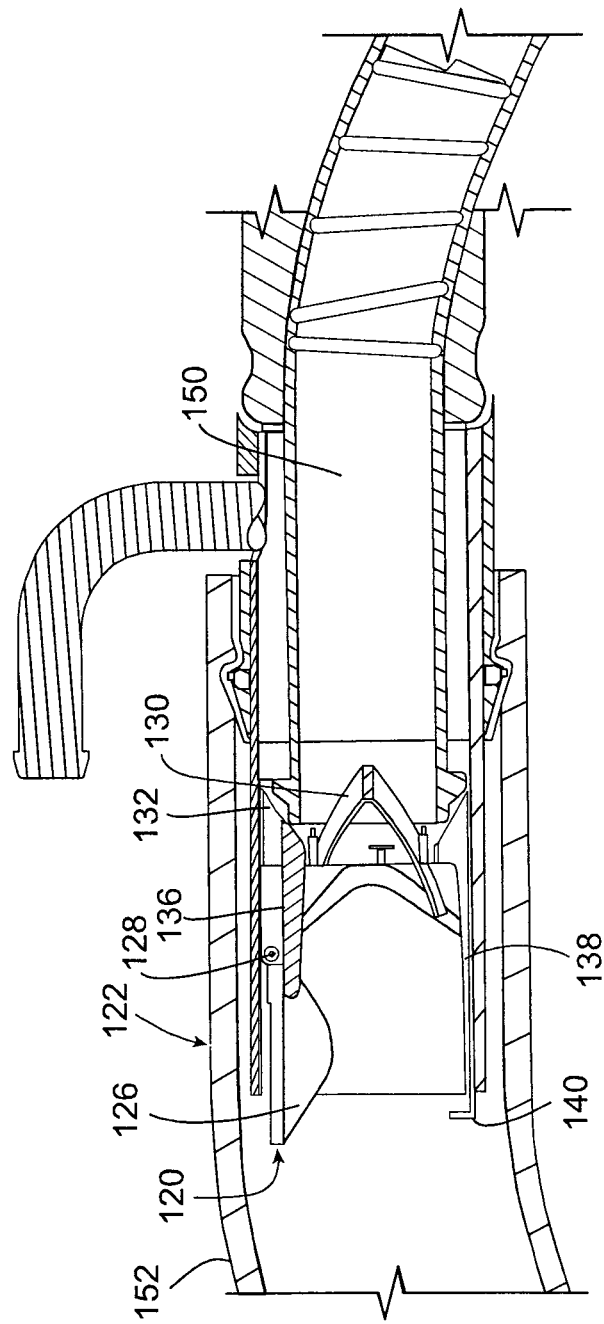
FIG. 18 illustrates an internal cross-sectional view of a diesel nozzle inserted into a fuel supply line according to an embodiment of the present invention.

FIG. 18 illustrates an internal cross-sectional view of a diesel nozzle 150 inserted into the fuel supply line 120 according to an embodiment of the present invention. The fuel supply line 120 may be a sleeve that fits into a proximate end of a conduit 152 that connects to a fuel tank. Optionally, the fuel supply line 120 may be an integral part of the conduit 152. As shown in FIG. 18, the cruciform cone 130 is sized to allow the diesel nozzle 150 to fit around a portion thereof that allows the plunger 136 to contact and open the flapper 126. Thus, diesel fuel may be dispensed from the diesel nozzle 150 into the conduit 152. When the nozzle 150 is removed, the spring 142 (shown in FIG. 16) urges the funneled ring 132 back to its at rest position, thereby disengaging the plunger 136 from the flapper 126. The spring-biased rod 128 acts to close the flapper 126 and the clasp 140 latches the flapper 126 in a closed position.

Figure 19:
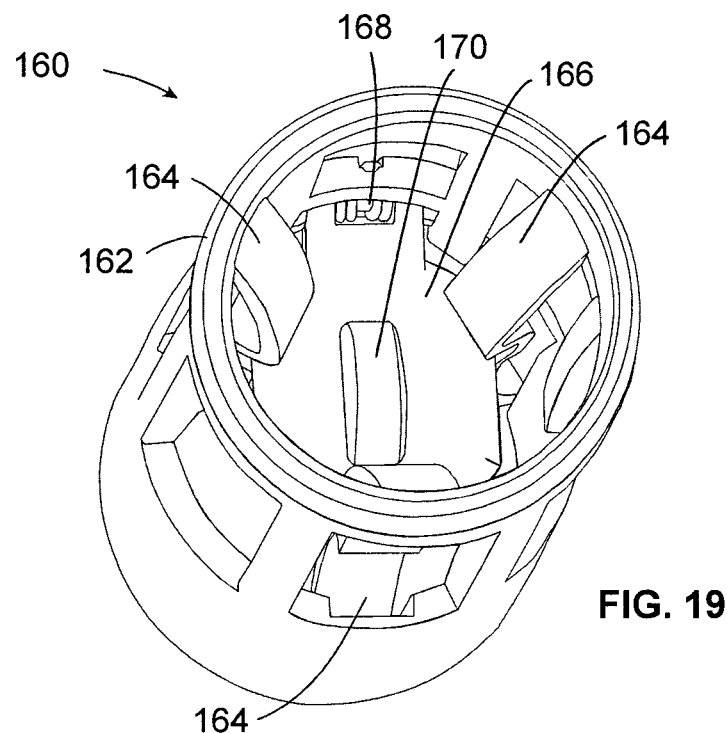
FIG. 19 illustrates a front isometric view of a fuel supply selective inhibitor according to an embodiment of the present invention.

FIG. 19 illustrates a front isometric view of a fuel supply selective inhibitor 160 according to an embodiment of the present invention. The inhibitor 160 may be a portion of a fuel supply line or a conduit, as described above. The inhibitor 160 includes a main cylindrical body 162 having a plurality of notched springs 164 extending into a central opening of the main cylindrical body 160.

A flapper 166 is pivotally secured within the main cylindrical body 160 through a spring-biased pivot member 168. A rib 170 extends upwardly from a top surface of the flapper 166. The rib 170 is configured to block progress of a high flow diesel nozzle past the flapper 166 when it is open, similar to the embodiments described above.

Figure 20:
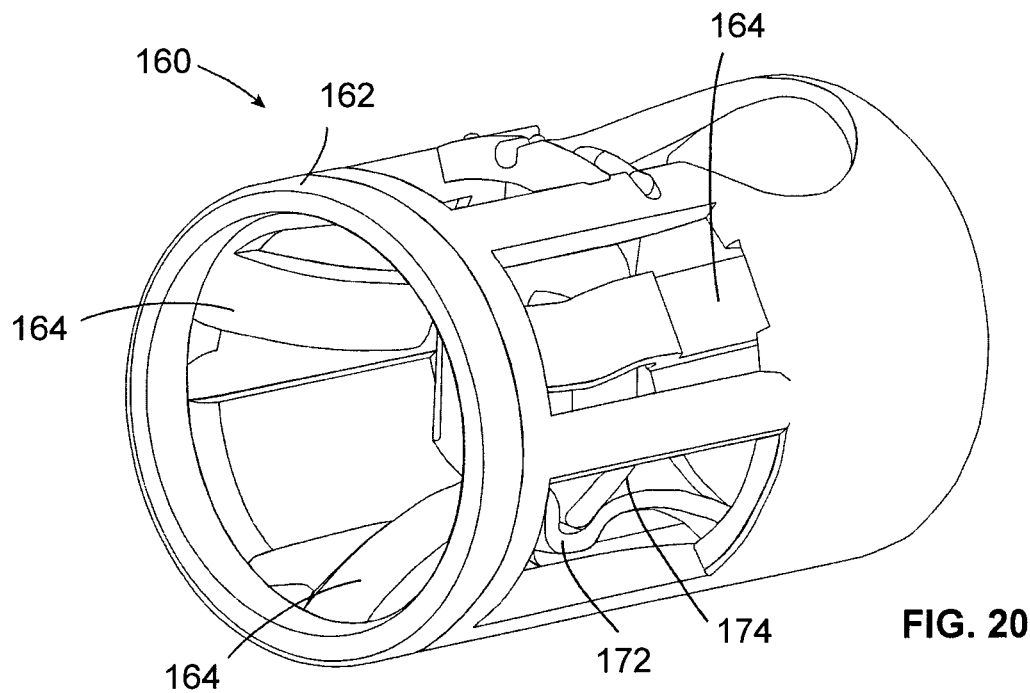
FIG. 20 illustrates a lateral isometric view of a fuel supply selective inhibitor according to an embodiment of the present invention.

FIG. 20 illustrates a lateral isometric view of the fuel supply selective inhibitor 160. As shown in FIG. 20, the springs 164 are bow-shaped having notches 172 formed at approximate central portions. The notches 172 retain circumferential edges 174 of the flapper 166 in the closed position.

Figure 21:
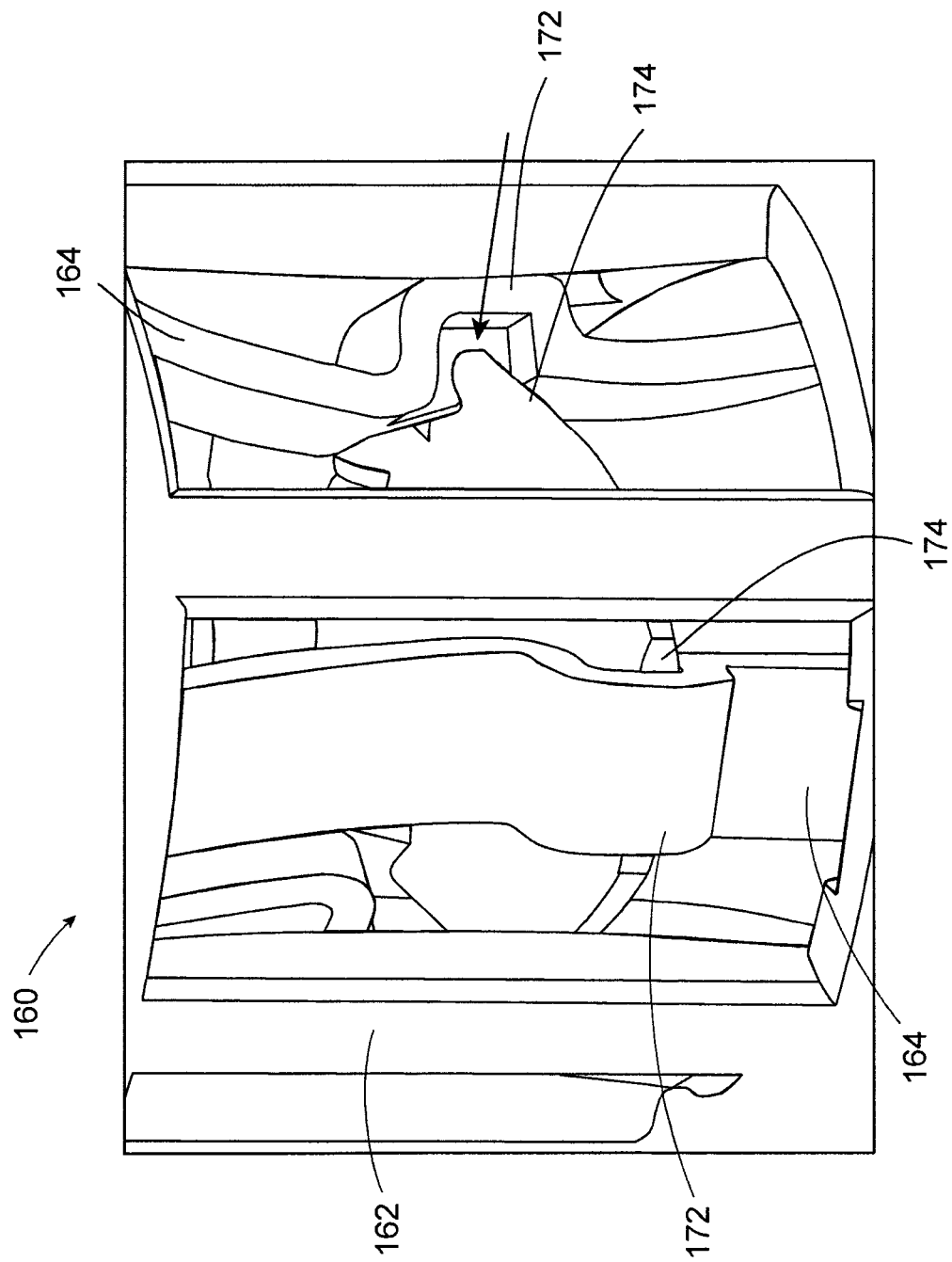
FIG. 21 illustrates an isometric view of a flapper in a closed position within a fuel supply selective inhibitor according to an embodiment of the present invention.

FIG. 21 illustrates an isometric view of the flapper 166 in a closed position within the fuel supply selective inhibitor 160. As shown in FIG. 21, circumferential edges 174 of the flapper 166 are retained by the notches 172 formed in the bow-shaped springs 164.

Figure 22:
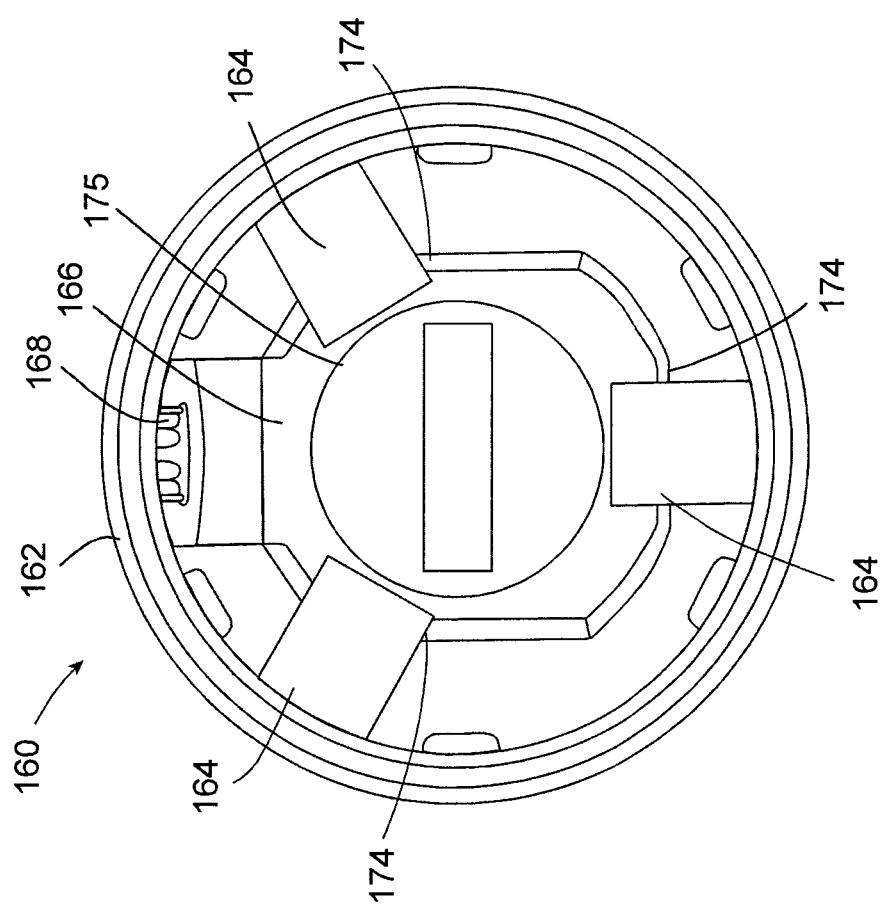
FIG. 22 illustrates an axial view of a gasoline nozzle within a fuel supply selective inhibitor according to an embodiment of the present invention.

FIG. 22 illustrates an axial view of a gasoline nozzle 175 within the fuel supply selective inhibitor 160. Referring to FIGS. 19-22, the area defined between the springs 164 is larger than the diameter of the gasoline nozzle 175. Thus, the gasoline nozzle 175 is unable to engage and spread all of the springs 164 away from one another simultaneously. If the nozzle 175 does engage one or even two of the springs 164 such that they spread open, at least one spring 164 will still securely engage a circumferential edge 174 of the flapper 166, thereby ensuring that the flapper 166 remains in the closed position.

Figure 23:
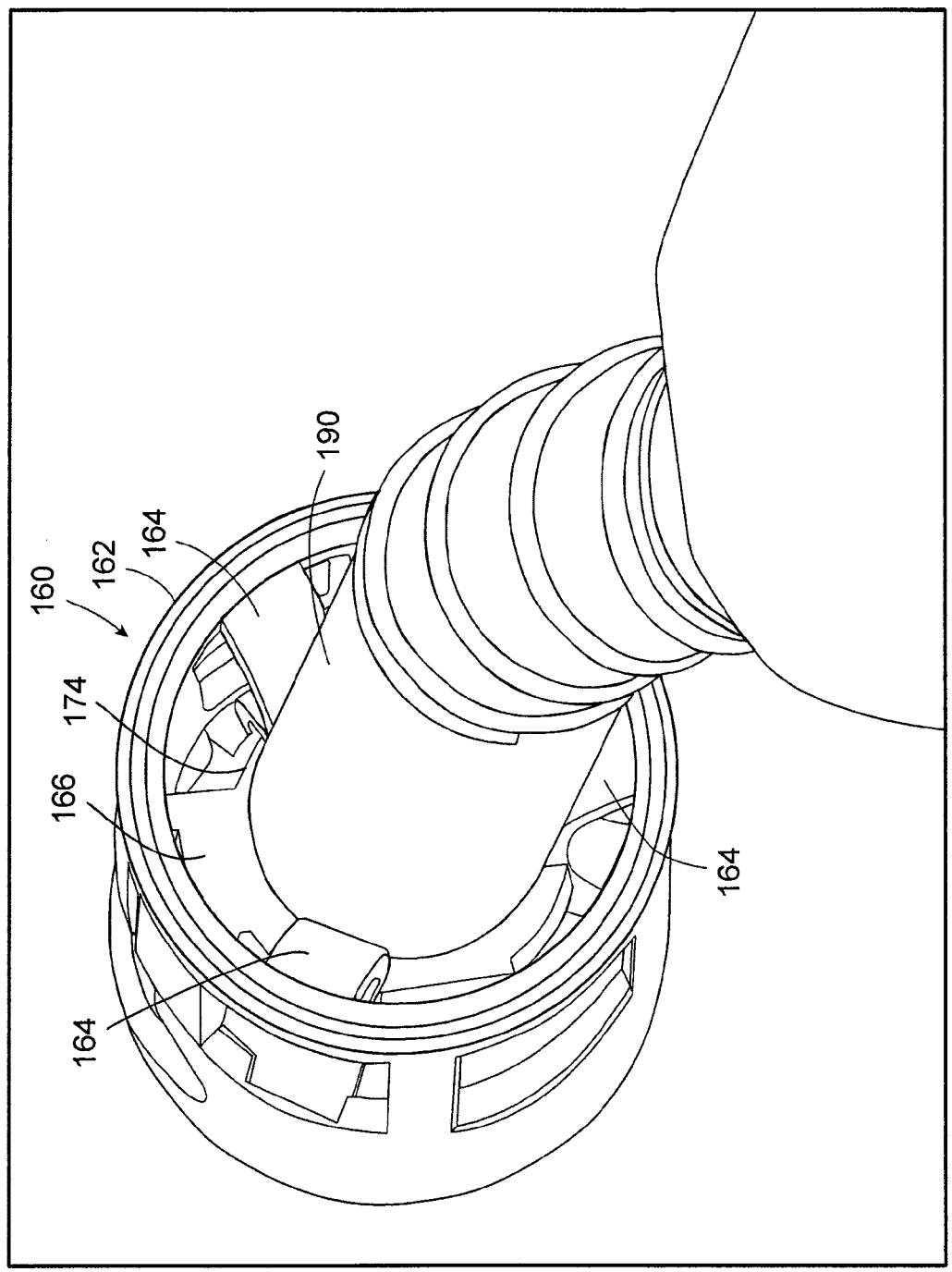
FIG. 23 illustrates an isometric view of a nozzle inserted into the fuel supply selective inhibitor according to an embodiment of the present invention.

FIG. 23 illustrates an isometric view of a diesel nozzle 190 inserted into the fuel supply selective inhibitor 160 according to an embodiment of the present invention. Referring to FIGS. 19-21 and 23, the diesel nozzle 190 is large enough to simultaneously engage and spread open all of the springs 164. As such, the springs 164 lose retaining contact with the flapper 166 and the nozzle 166 is allowed to push the flapper 166 open. When the nozzle 190 is removed, the flapper 166 springs back to its closed position and the springs 164 flex back to their at-rest positions in which they retain circumferential edges 174 of the flapper 166.

While three springs 164 are shown, more or less than those shown may be used with the inhibitor 160. Additionally, as noted above, the inhibitor 160 may be part of a fuel supply line or a conduit that connects to a fuel tank.

Thus, embodiments of the present invention provide a variety of selective fuel supply or nozzle inhibitors that allow one type of nozzle to dispense fuel into a fuel tank, but prevent another type of nozzle doing so. For example, embodiments of the present invention allow a standard diesel fuel nozzle to open a flapper within a fuel line, but prevent smaller nozzles, such as gasoline nozzles, from doing so. As such, embodiments of the present invention prevent a vehicle operator from accidentally dispensing the wrong type of fuel into the vehicle.

Embodiments of the present invention prevent gasoline nozzles (~Ø21 mm) and other relatively small-diameter nozzles (such as urea nozzles) from dispensing fluid into a diesel fuel tank. At the same time, embodiments of the present invention allow standard nozzles (~Ø25 mm) and even high flow diesel nozzles (~Ø30 mm-Ø36 mm) to dispense fuel into a diesel fuel tank.

While various spatial terms, such as upper, bottom, lower, mid, lateral, horizontal, vertical, and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A fuel intake assembly, comprising:
a main tube defining a fuel channel;
at least one flapper pivotally secured within said main tube, said at least one flapper closing said fuel channel in a closed position; and
a selective nozzle inhibitor proximate said at least one flapper,
wherein said selective nozzle inhibitor is configured to allow a first nozzle having a first diameter to move said at least one flapper into an open position, and configured to allow a second nozzle having a second diameter to move said at least one flapper into the open position, wherein the second diameter is greater than the first diameter,
wherein said selective nozzle inhibitor is configured to prevent a third nozzle having a third diameter to move said at least one flapper into the open position, wherein the third diameter is less than the first diameter,
wherein said selective nozzle inhibitor comprises a funneled ring and a cruciform cone within said main tube, said funneled ring comprising a plunger and a clasp, said clasp configured to securely retain said at least one flapper in the closed position,
wherein said funneled ring is configured to allow the first and second nozzles to urge said plunger into said at least one flapper and said clasp away from said at least one flapper to move said at least one flapper into the open position.

2. The fuel intake assembly of claim 1, wherein said cruciform cone is configured to prevent the third nozzle from urging said plunger into said at least one flapper.

3. The fuel intake assembly of claim 1, comprising a compression spring positioned between said cruciform cone and said funneled ring.

4. The fuel intake assembly of claim 1, wherein the first nozzle is a standard diesel nozzle, the second nozzle is a high flow diesel nozzle having a ringed end, and the third nozzle is a gasoline nozzle.

5. The fuel intake assembly of claim 4, wherein said cruciform cone is configured to prevent the gasoline nozzle from urging said plunger into said at least one flapper.

6. The fuel intake assembly of claim 4, comprising a compression spring positioned between said cruciform cone and said funneled ring.

7. A fuel intake assembly, comprising:
a main tube defining a fuel channel;
at least one flapper pivotally secured within said main tube, said at least one flapper closing said fuel channel in a closed position; and
a selective nozzle inhibitor proximate said at least one flapper,
wherein said selective nozzle inhibitor is configured to allow a first nozzle having a first diameter to move said at least one flapper into an open position, and configured to allow a second nozzle having a second diameter to move said at least one flapper into the open position, wherein the second diameter is greater than the first diameter,
wherein said selective nozzle inhibitor is configured to prevent a third nozzle having a third diameter to move said at least one flapper into the open position, wherein the third diameter is less than the first diameter,
wherein said selective nozzle inhibitor comprises at least one spring having a portion convex away from said at least one flapper in a radial direction of said at least one flapper to define a recess for retaining an edge of said at least one flapper in the closed position,
wherein said spring is configured to be flexed away from said at least one flapper by any of the first and second nozzles so that said edge of said at least one flapper disengages from said recess, and
wherein the recess configured to retain the edge of said at least one flapper in the closed position is formed at a central portion of the at least one spring.

8. The fuel intake assembly of claim 7, wherein said at least one spring is a bow-shaped spring configured to not be flexed away from said at least one flapper by the third nozzle.

9. The fuel intake assembly of claim 7,
wherein said at least one spring comprises a plurality of springs,
wherein distances between said plurality of springs proximate said at least one flapper in the closed position are greater than the third diameter, but less than the first and second diameters.

10. The fuel intake assembly of claim 7,
wherein the first nozzle is a standard diesel nozzle, the second nozzle is a high flow diesel nozzle having a ringed end, and the third nozzle is a gasoline nozzle, and
wherein the standard and high flow diesel nozzles are configured to flex said spring away from said at least one flapper so that said edge of said at least one flapper disengages from said recess.

11. The fuel intake assembly of claim 10, wherein said spring is configured not to be flexed away from said at least one flapper by the gasoline nozzle.

12. The fuel intake assembly of claim 10,
wherein said at least one spring comprises a plurality of springs, and
wherein distances between said plurality of springs proximate said at least one flapper in the closed position are greater than the third diameter, but less than the first and second diameters.

13. The fuel intake assembly of claim 7, wherein said at least one flapper comprises a rib configured to prevent the second nozzle from moving past said at least one flapper in the open position.

14. A fuel intake assembly, comprising:
a main tube defining a fuel channel;
at least one flapper pivotally secured within said main tube, said at least one flapper closing said fuel channel in a closed position; and
a selective nozzle inhibitor proximate said at least one flapper,
wherein said selective nozzle inhibitor is configured to allow a first nozzle having a first diameter to move said at least one flapper into an open position, and configured to allow a second nozzle having a second diameter to move said at least one flapper into the open position, wherein the second diameter is greater than the first diameter,
wherein said selective nozzle inhibitor is configured to prevent a third nozzle having a third diameter to move said at least one flapper into the open position, wherein the third diameter is less than the first diameter,
wherein said selective nozzle inhibitor comprises first and second fingers,
wherein said at least one flapper is pivotally secured to said first finger, an inner surface of said first finger being configured to directly contact the first nozzle or the second nozzle at the open position,
said second finger comprises a slot extending through a thickness of the second finger to retain an edge of said at least one flapper in the closed position, and
wherein said fingers are configured to be flexed away from one another by any of the first and second nozzles so that said edge of said at least one flapper disengages from said slot.

15. The fuel intake assembly of claim 14, wherein a distance between said first finger and said second finger proximate said at least one flapper in the closed position is greater than the third diameter, but less than the first and second diameters.

16. The fuel intake assembly of claim 14,
wherein the first nozzle is a standard diesel nozzle, the second nozzle is a high flow diesel nozzle having a ringed end, and the third nozzle is a gasoline nozzle,
wherein said selective nozzle inhibitor comprises first and second fingers,
wherein said at least one flapper is pivotally secured to an inner surface of said first finger, said second finger comprises a slot that retains an edge of said at least one flapper in the closed position, and
wherein the standard and high flow diesel nozzles are configured to flex said fingers away from one another so that said edge of said at least one flapper disengages from said slot.

17. The fuel intake assembly of claim 16, wherein a distance between said first finger and said second finger proximate said at least one flapper in the closed position is greater than the third diameter, but less than the first and second diameters.

18. The fuel intake assembly of claim 14, wherein each of the first and second fingers comprises
an upper section extending upward from an inner surface of the main tube and toward an axial center of the main tube,
an intermediate section contiguously extending downward from the upper section and toward the axial center, and
a lower section contiguously extending downward from the intermediate section and away from the axial center,
wherein said at least one flapper is disposed between the lower sections of the first and second fingers, and wherein a distance between the lower sections of the first and second fingers and above the at least one flapper in the closed position is greater than a distance between the intermediate sections of the first and second fingers.

19. The fuel intake assembly of claim 14, wherein said at least one flapper comprises a rib configured to prevent the second nozzle from moving past said at least one flapper in the open position.

20. A fuel intake assembly, comprising:
a main tube defining a fuel channel;
a pair of hinge portions opposing each other in a radial direction of the main tube;
a pair of flappers pivotally secured within said main tube by the pair of hinge portions, respectively, said pair of flappers closing said fuel channel in a closed position; and
a selective nozzle inhibitor proximate said pair of flappers, wherein said selective nozzle inhibitor is configured to allow a first nozzle having a first diameter to move said pair of flappers into an open position, and configured to allow a second nozzle having a second diameter to move said pair of flappers into the open position, wherein the second diameter is greater than the first diameter,
wherein said selective nozzle inhibitor is configured to prevent a third nozzle having a third diameter to move said pair of flappers into the open position, wherein the third diameter is less than the first diameter,
wherein said selective nozzle inhibitor comprises a pair of assemblies,
wherein the pair of assemblies and the pair of hinge portions are alternately arranged along a circumferential direction of the main tube,
wherein each of said assemblies comprises:
a member having a curved surface configured to engage with and be pushed by any of the first and second nozzles,
a compression spring operatively connected to the member, and
a ledge outwardly extending from said compression spring below, but not beyond, said member, said ledge supporting the corresponding flapper in the closed position,
wherein said compression springs are coil springs,
wherein said compression springs are configured to be both compressed at the same time by any of the first and second nozzles to disengage said ledges from said flappers, and
wherein said compression springs are configured to not be both compressed at the same time by the third nozzle.

21. The fuel intake assembly of claim 20, wherein said at least one flapper comprises at least one protuberance configured to prevent the second nozzle from moving past said at least one flapper in the open position.

22. The fuel intake assembly of claim 20, wherein each of the members of the assemblies is a roller.

23. The fuel intake assembly of claim 20,
wherein the first nozzle is a standard diesel nozzle, the second nozzle is a high flow diesel nozzle having a ringed end, and the third nozzle is a gasoline nozzle,
wherein the standard and high flow diesel nozzles are configured to compress said compression springs and disengage said ledges from said at least one flapper, and
wherein the gasoline nozzle is unable to compress both of said compression springs at the same time.

24. The fuel intake assembly of claim 23, wherein said at least one flapper comprises at least one protuberance configured to prevent the high flow diesel nozzle from moving past said at least one flapper in the open position.

25. A fuel intake assembly, comprising:
a main tube defining a fuel channel;
a web directly secured to a circumferential inner surface of said fuel channel, said web comprising open areas;
a plurality of pivot arms positioned over said web, each of said plurality of pivot arms comprising
an angled beam that is pivotally secured within said main tube,
a leg integrally connected to the angled beam, and
a shelf integrally connected to the leg; and
an annular spring compressively biasing said plurality of pivot arms together in the closed position,
wherein a diameter of the web is greater than a diameter of the annular spring,
wherein said pivot arms are configured to be spread apart, by each of first and second nozzles having first and second diameters, respectively, to expose said open areas of said web,
wherein the second diameter is greater than the first diameter, and
wherein said pivot arms are configured to not be spread apart by a third nozzle, wherein the third nozzle has a third diameter that is less than the first diameter.

26. The fuel intake assembly of claim 25, wherein the first diameter is 25 mm, the second diameter is 36 mm and the third diameter is less than 21 mm.

* * * * *